United States Patent
Ishimoto et al.

(10) Patent No.: US 9,121,784 B2
(45) Date of Patent: Sep. 1, 2015

(54) TORQUE DETECTOR AND ELECTRIC POWER STEERING SYSTEM INCLUDING THE TORQUE DETECTOR

(71) Applicant: JTEKT CORPORATION, Osaka-shi, Osaka (JP)

(72) Inventors: Yutaro Ishimoto, Kashiwara (JP); Yoshitomo Tokumoto, Nabari (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/259,807

(22) Filed: Apr. 23, 2014

(65) Prior Publication Data

US 2014/0331788 A1     Nov. 13, 2014

(30) Foreign Application Priority Data

May 7, 2013     (JP) .................. 2013-097726

(51) Int. Cl.
  *G01L 3/02* (2006.01)
  *G01L 3/10* (2006.01)
  *B62D 6/10* (2006.01)
  *G01L 5/22* (2006.01)

(52) U.S. Cl.
  CPC . *G01L 3/104* (2013.01); *B62D 6/10* (2013.01); *G01L 5/221* (2013.01)

(58) Field of Classification Search
  CPC ........... B62D 6/10; G01L 3/104; G01L 5/221
  USPC ................. 73/862.331–862.335, 862.325
  See application file for complete search history.

(56) References Cited

U.S. PATENT DOCUMENTS

| 6,211,585 B1* | 4/2001 | Sato et al. ................. 310/49.55 |
| 2003/0037622 A1 | 2/2003 | Laidlaw |
| 2004/0011138 A1* | 1/2004 | Gandel et al. .................. 73/847 |
| 2006/0137474 A1* | 6/2006 | Nakane et al. ........... 73/862.331 |
| 2008/0258715 A1* | 10/2008 | Reichert ................. 324/207.13 |

FOREIGN PATENT DOCUMENTS

| EP | 1 808 682 A2 | 7/2007 |
| EP | 1 850 106 A2 | 10/2007 |
| JP | B2-4561748 | 10/2010 |

OTHER PUBLICATIONS

Extended European Search Report issued in European Patent Application No. 14166404.5 on Oct. 30, 2014.

* cited by examiner

*Primary Examiner* — Max Noori
(74) *Attorney, Agent, or Firm* — Oliff PLC

(57) ABSTRACT

A torque detector includes a permanent magnet, a pair of magnetic yokes, and a magnetic sensor. The magnetic yokes include a first magnetic yoke and a second magnetic yoke. The first magnetic yoke has a first ring and a plurality of first teeth extending from the first ring in an axial direction. The second magnetic yoke has a second ring and a plurality of second teeth extending from the second ring in the axial direction. The first teeth extend in the axial direction beyond the second ring of the second magnetic yoke. The second teeth extend in the axial direction beyond the first ring of the first magnetic yoke.

12 Claims, 11 Drawing Sheets

TORQUE DETECTOR AND ELECTRIC POWER STEERING SYSTEM INCLUDING THE TORQUE DETECTOR

INCORPORATION BY REFERENCE

The disclosure of Japanese Patent Application No. 2013-097726 filed on May 7, 2013 including the specification, drawings and abstract is incorporated herein by reference in its entirety.

BACKGROUND OF THE INVENTION

1. Field of the Invention

The invention relates to a torque detector including magnetic yokes, and an electric power steering system including the torque detector.

2. Description of the Related Art

With reference to FIG. 15, the configuration of a conventional torque detector 200 will be described below. The torque detector 200 includes a permanent magnet 210, a pair of magnetic yokes 220 (220A, 220B), and a magnetic sensor 230. The permanent magnet 210 is magnetized such that the north poles and the south poles are alternately arranged in the circumferential direction. The magnetic yokes 220 are disposed so as to surround the permanent magnet 210. The first magnetic yoke 220A has a first ring 221 having an annular shape, and a plurality of first teeth 222. The second magnetic yoke 220B has a second ring 223 having an annular shape, and a plurality of second teeth 224. The magnetic sensor 230 is located between the first ring 221 and the second ring 223. The magnetic sensor 230 detects a magnetic flux density between the first ring 221 and the second ring 223. Japanese Patent No. 4561748 describes an example of a conventional torque detector.

If the area in which the permanent magnet and the teeth of each magnetic yoke are opposed to each other (hereinafter, referred to as "opposing area between the permanent magnet and the teeth of the magnetic yoke") is increased, the amount of magnetic flux transferred between the permanent magnet and the teeth is increased and thus the density of magnetic flux passing through the magnetic sensor is increased. As a result, the accuracy of detection by the torque detector is enhanced. In the conventional torque detector 200, the opposing area between the permanent magnet 210 and the teeth 222, 223 can be increased by setting the width HR of each of the teeth 222, 224 to a larger value.

However, if the width HR of each of the teeth 222, 224 is set to a larger value, the gaps between the teeth 222 and the teeth 224 that are adjacent to each other in the circumferential direction may become excessively narrower, and, as a result, the amount of magnetic flux leakage between the first teeth 222 and the second teeth 224 is increased. Thus, there are limits to increasing the opposing area between the permanent magnet and the teeth of the magnetic yokes by increasing the width of each of the teeth of the magnetic yokes.

SUMMARY OF THE INVENTION

One object of the invention is to increase the density of magnetic flux passing through a magnetic sensor in a torque detector.

A torque detector according to an aspect of the invention includes: a permanent magnet attached to one of an input shaft and an output shaft that are connected to each other by a torsion bar so as to be rotated relative to each other in response to torsion of the torsion bar, and magnetized in a circumferential direction of the torque detector; magnetic yokes including a first magnetic yoke having a first ring disposed around an outer periphery of the permanent magnet and a plurality of first teeth extending from the first ring in an axial direction of the torque detector, and a second magnetic yoke having a second ring disposed around the outer periphery of the permanent magnet so as to be opposed to and apart from the first ring in the axial direction and a plurality of second teeth extending from the second ring toward the first ring in the axial direction, the first teeth and the second teeth being alternately arranged in the circumferential direction, and the magnetic yokes being attached to the other one of the input shaft and the output shaft so as to be located in a magnetic field created by the permanent magnet; and a magnetic sensor that detects a magnetic flux density of a magnetic circuit formed of the permanent magnet, the first magnetic yoke and the second magnetic yoke. In the torque detector, the first teeth extend in the axial direction beyond the second ring, and the second teeth extend in the axial direction beyond the first ring.

In the torque detector according to the above aspect, the first teeth extend in the axial direction beyond the second ring, and the second teeth extend in the axial direction beyond the first ring. Thus, it is possible to restrain the gaps between the first teeth and the second teeth, which are adjacent to each other in the circumferential direction, from being excessively small due to an increase in the opposing area between the teeth and the permanent magnet. Therefore, it is possible to suppress an increase in the amount of magnetic flux leakage between the first teeth and the second teeth, which are adjacent to each other in the circumferential direction. Therefore, the density of magnetic flux passing through the magnetic sensor is larger than that in the conventional torque detector.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4A and FIG. 4B are views illustrating a magnetic yoke of the torque detector according to the embodiment, wherein FIG. 4A is a perspective view of a first magnetic yoke, and FIG. 4B is a front view of a first tooth;

FIG. 5A, FIG. 5B, and FIG. 5C are views illustrating the magnetic yokes of the torque detector according to the embodiment, wherein FIG. 5A is a side view of a pair of the magnetic yokes, FIG. 5B is an enlarged view of a portion where the first tooth and the second ring are overlapped with each other in the radial direction, and FIG. 5C is an enlarged view of a portion where the second tooth and the first ring are overlapped with each other in the radial direction;

FIG. 6A, FIG. 6B and FIG. 6C are views for describing a method of manufacturing the magnetic yoke of the torque detector according to the embodiment, wherein FIG. 6A is a view illustrating a first step, FIG. 6B is a view illustrating a second step, and FIG. 6C is a view illustrating a third step;

FIG. 10A and FIG. 10B are views illustrating a pair of magnetic yokes of a torque detector in a comparative example, wherein FIG. 10A is a side view of the pair of magnetic yokes, and FIG. 10B is a sectional view taken along the line Z10-Z10 in FIG. 10A;

FIG. 11A and FIG. 11B are views illustrating a pair of magnetic yokes of a torque detector in a comparative example, wherein FIG. 11A is a side view of the pair of magnetic yokes, and FIG. 11B is a sectional view taken along the line Z11-Z11 in FIG. 11A;

DETAILED DESCRIPTION OF EMBODIMENTS

Figure 1:
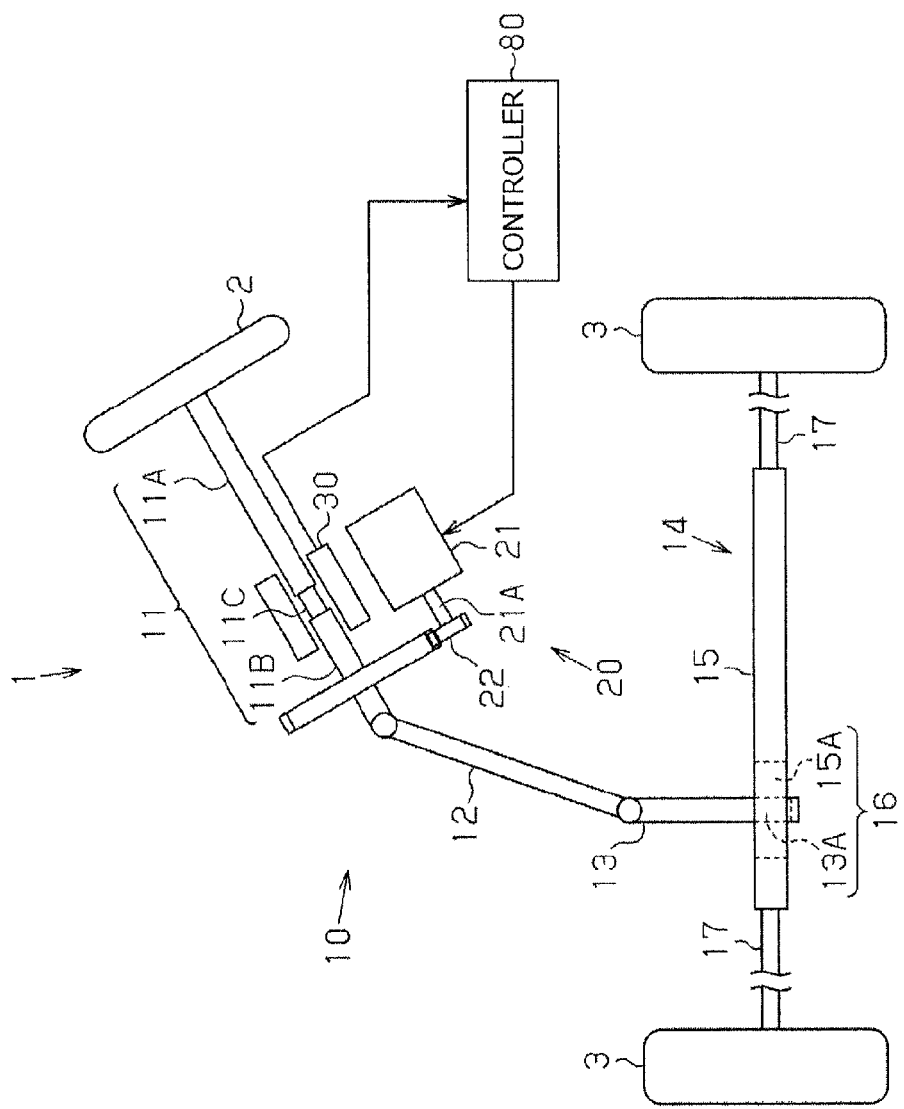
FIG. 1 is a view schematically illustrating the configuration of an electric power steering system according to an embodiment of the invention.

With reference to FIG. 1, the configuration of an electric power steering system 1 will be described below. The electric power steering system 1 includes a steering mechanism 10, a steered mechanism 14, an assist mechanism 20 and a torque detector 30.

The steering mechanism 10 includes a column shaft 11, an intermediate shaft 12 and a pinion shaft 13. The column shaft 11 includes an input shaft 11A, an output shaft 11B and a torsion bar 11C. An upper end portion of the input shaft 11A is connected to a steering member 2. The input shaft 11A and the output shaft 11B are linked to each other via the torsion bar 11C so as to be rotatable relative to each other. Opposite end portions of the torsion bar 11C are secured respectively to the input shaft 11A and output shaft 11B with pins 11D (refer to FIG. 2). The torsion bar 11C is twisted in response to the difference between torques that are applied respectively to the input shaft 11A and the output shaft 11B.

An upper end portion of the intermediate shaft 12 is connected to a lower end portion of the output shaft 11B of the column shaft 11. An upper end portion of the pinion shaft 13 is connected to a lower end portion of the intermediate shaft 12. Pinion teeth 13A are formed on the pinion shaft 13 over a prescribed range in the axial direction of the pinion shaft 13.

The steered mechanism 14 includes a rack shaft 15. Rack teeth 15A are formed on the rack shaft 15 over a prescribed range in the axial direction of the rack shaft 15. The rack teeth 15A of the rack shaft 15 are meshed with the pinion teeth 13A of the pinion shaft 13. The rack teeth 15A and the pinion teeth 13A are meshed with each other to constitute a rack-and-pinion mechanism 16. Opposite end portions of the rack shaft 15 are linked respectively to steered wheels 3 via, for example, tie rods 17.

With the configurations of the steering mechanism 10 and the steered mechanism 14 described above, when torque is applied to the steering member 2 by a driver, the pinion shaft 13 is rotated by the torque that is transmitted via the column shaft 11 and the intermediate shaft 12. The rotation of the pinion shaft 13 is converted into a reciprocating motion of the rack shaft 15 in its axial direction by the rack-and-pinion mechanism 16. The axial reciprocating motion of the rack shaft 15 steers the steered wheels 3 with the use of, for example, the tie rods 17.

The assist mechanism 20 includes an electric motor 21, a controller 80 and a speed reducer 22. The electric power steering system 1 according to the present embodiment is a column assist-type electric power steering system in which torque is transmitted from the electric motor 21 to the column shaft 11 to assist the driver in performing a steering operation. The electric motor 21 is disposed near the column shaft 11. The speed reducer 22 is a worm gear including a worm shaft and a worm wheel that are meshed with each other. The worm shaft is coupled to the electric motor 21 (not illustrated in detail). The worm wheel is fitted on the output shaft 11B of the column shaft 11 (not illustrated in detail). The assist mechanism 20 transmits the rotation of an output shaft 21A of the electric motor 21 to the column shaft 11 via the speed reducer 22, thereby assisting the driver in operating the steering member 2.

The controller 80 computes a steering torque corresponding to a steering operation by the driver, on the basis of a signal that corresponds to the degree of torsion of the torsion bar 11C and that is transmitted from the torque detector 30. The controller 80 computes an assist torque for assisting the driver in performing a steering operation, on the basis of the steering torque. The controller 80 controls the driving of the electric motor 21 on the basis of the thus computed assist torque.

With the configuration of the assist mechanism 20 described above, when the torsion bar 11C is twisted in response to a steering operation by the driver, the controller 80 computes an assist torque. The electric motor 21 is driven on the basis of the thus computed assist torque, and the output shaft 21A of the electric motor 21 is rotated. The torque transmitted from the output shaft 21A of the electric motor 21 is applied to the column shaft 11 via the speed reducer 22.

Figure 2:
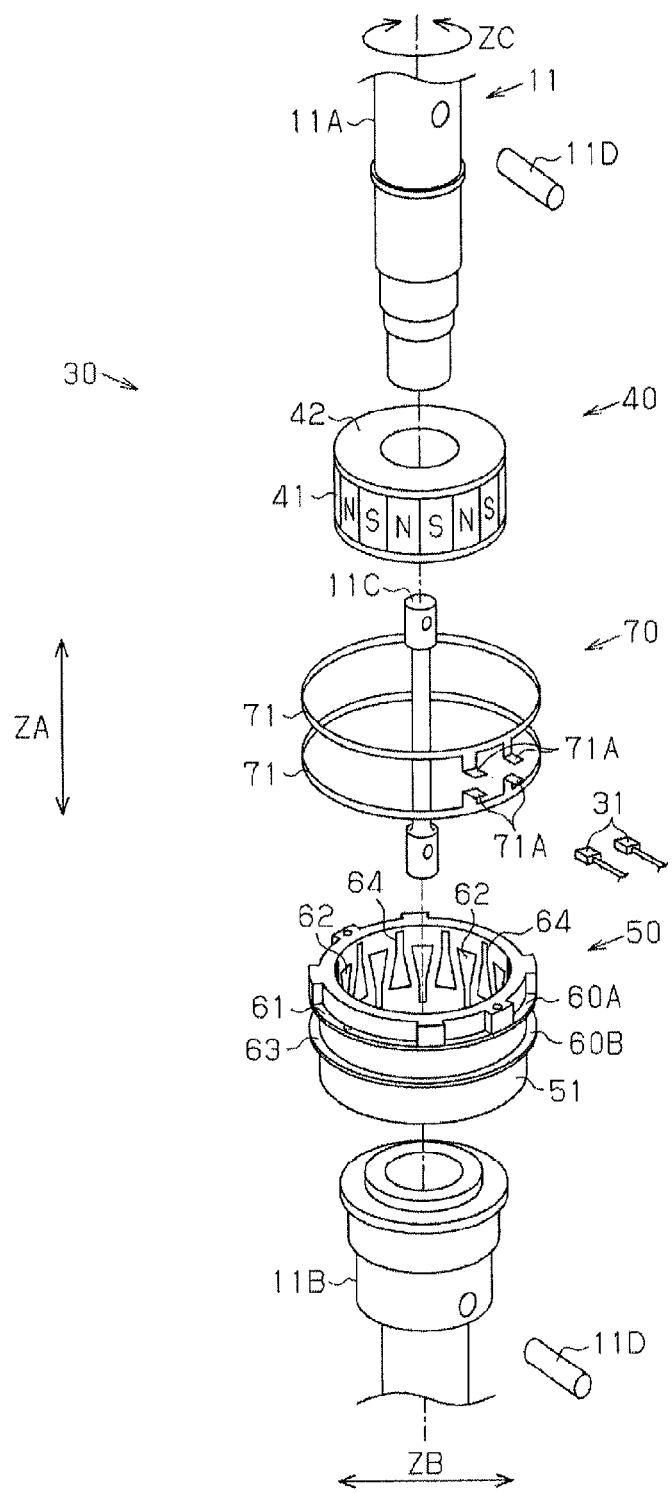
FIG. 2 is an exploded perspective view illustrating a torque detector of the electric power steering according to the embodiment.

The schematic configuration of the torque detector 30 will be described with reference to FIG. 2 to FIG. 5. As illustrated in FIG. 2, the torque detector 30 includes a magnet unit 40, a magnetic yoke unit 50, a magnetic flux collecting unit 70 and two magnetic sensors 31.

Figure 3:
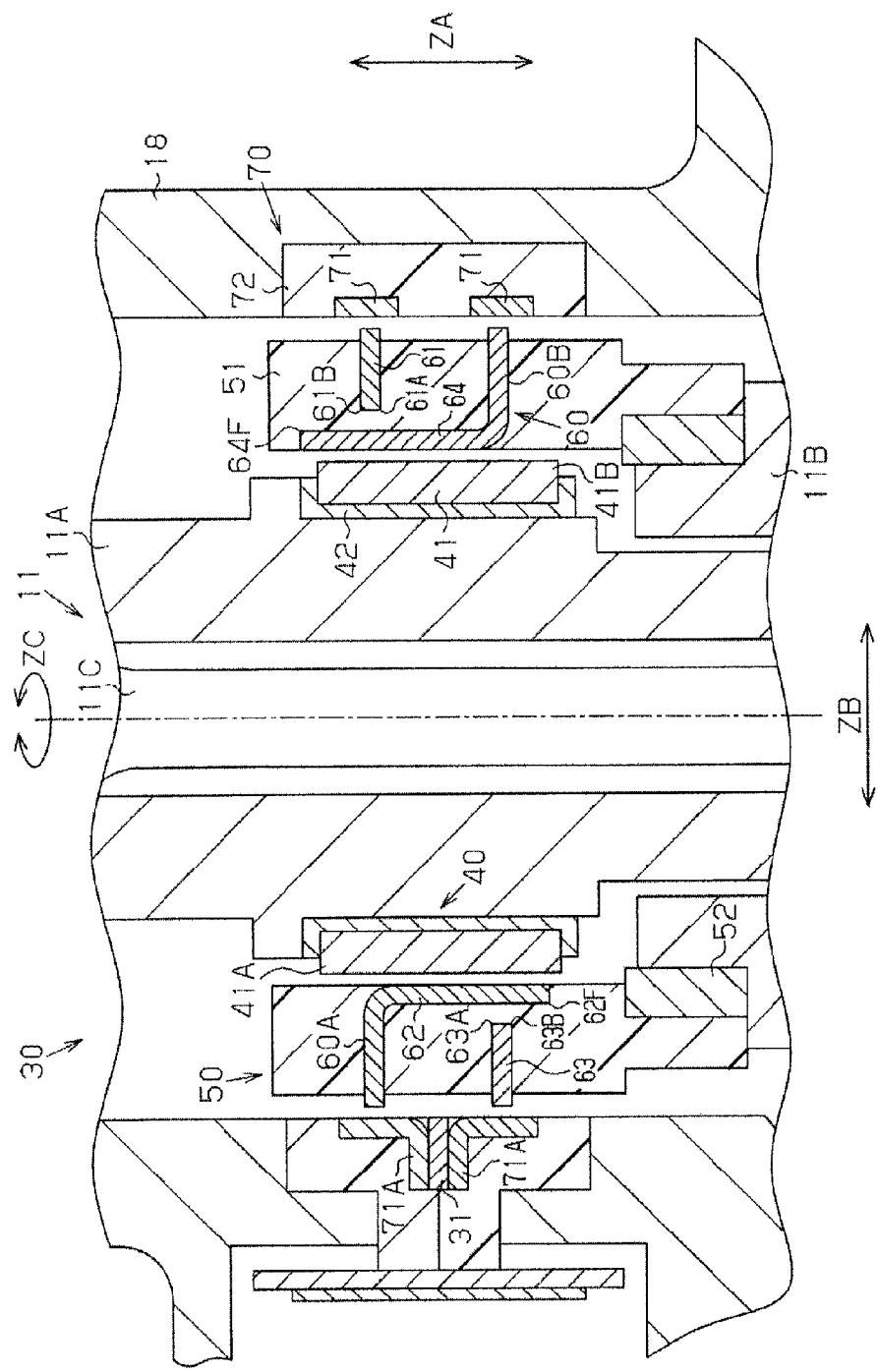
FIG. 3 is a sectional view of the torque detector and its surroundings in the electric power steering system according to the embodiment, taken along the axial direction of the torque detector.

As illustrated in FIG. 2 and FIG. 3, the magnet unit 40 has a cylindrical shape. The magnet unit 40 is secured to the outer peripheral face of the input shaft 11A. The magnet unit 40 is disposed so as to be coaxial with the column shaft 11. The magnet unit 40 includes a permanent magnet 41 and a core 42.

The permanent magnet 41 has a cylindrical shape. The permanent magnet 41 is magnetized such that the south poles and the north poles are alternately arranged in a circumferential direction ZC. In the present embodiment, the permanent magnet 41 is a multipolar magnet having 24 poles. The core 42 is made of a magnetic metal material. The core 42 is secured to the inner peripheral face of the permanent magnet 41. The core 42 covers the inner peripheral face and end faces of the permanent magnet 41, the end faces being end faces as viewed in an axial direction ZA of the torque detector 30. The permanent magnet 41 is secured to the outer peripheral face of the input shaft 11 via the core 42.

As illustrated in FIG. 2 and FIG. 3, the magnetic yoke unit 50 has a cylindrical shape. The magnetic yoke unit 50 is secured to the output shaft 11B via a fixing member 52. The magnetic yoke unit 50 is disposed outward of the magnet unit 40 with a gap in a radial direction ZB of the torque detector 30 so as to be coaxial with the column shaft 11.

The magnetic yoke unit 50 includes a pair of magnetic yokes 60, that is, a first magnetic yoke 60A and a second magnetic yoke 60B, and a yoke holder 51. In the magnetic yoke unit 50, the first magnetic yoke 60A, the second magnetic yoke 60B and the yoke holder 51 are formed as one unit body. The pair of magnetic yokes 60 is disposed in a magnetic field created by the permanent magnet 41. Note that, in the following description, the first magnetic yoke 60A and the second magnetic yoke 60B will be collectively referred to as "magnetic yokes 60" where appropriate.

Figure 4A:
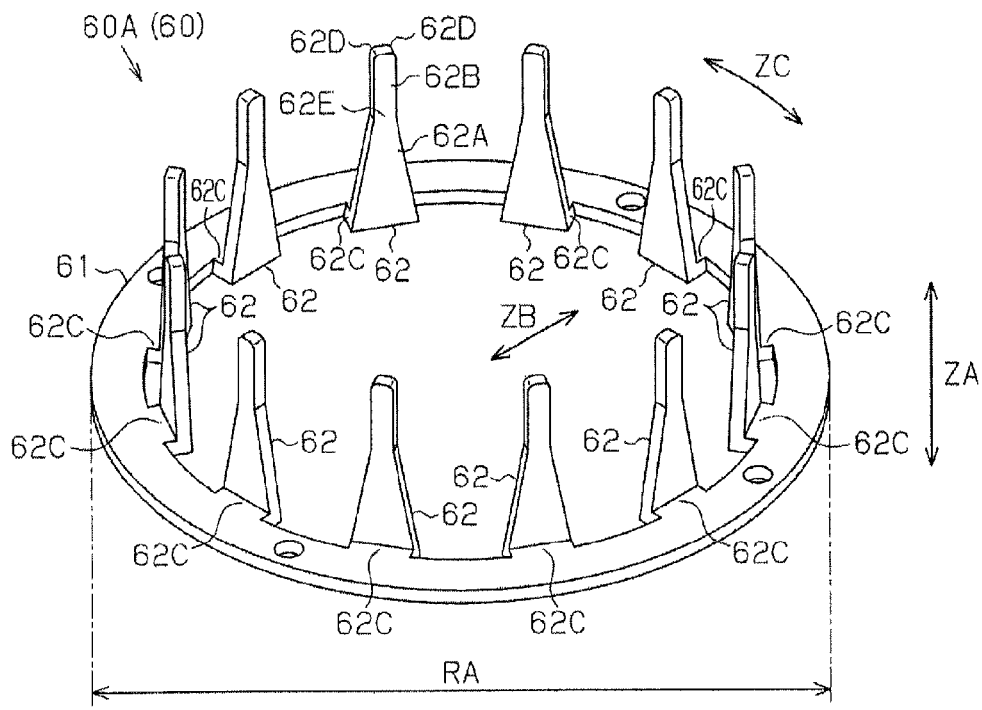

As illustrated in FIG. 4A, the first magnetic yoke 60A is made of a soft magnetic metal material. The first magnetic yoke 60A has a first ring 61 and twelve first teeth 62. The first ring 61 has an annular shape, and is disposed so as to be coaxial with the column shaft 11. The first ring 61 is disposed around the outer periphery of the permanent magnet 41. The first teeth 62 extend from the inner edge portion of the first ring 61 in the axial direction ZA of the column shaft 11. The twelve first teeth 62 are arranged over the entire periphery of the first ring 61 at equal intervals in the circumferential direction ZC. The second magnetic yoke 60B has the same configuration as that of the first magnetic yoke 60A, and thus description on the second magnetic yoke 60B will be omitted.

As illustrated in FIG. 5, the first ring 61 of the first magnetic yoke 60A and a second ring 63 of the second magnetic yoke 60B are opposed to each other so as to be apart from each other in the axial direction ZA. The twelve first teeth 62 of the first magnetic yoke 60A and twelve second teeth 64 of the second magnetic yoke 60B are arranged at equal intervals in the circumferential direction ZC of the column shaft 11. The second ring 63 is disposed around the outer periphery of the permanent magnet 41. The twelve first teeth 62 of the first magnetic yoke 60A extend toward the second magnetic yoke 60B in the axial direction ZA. The twelve second teeth 64 of the second magnetic yoke 60B extend toward the first magnetic yoke 60A in the axial direction ZA. The twelve first teeth 62 and the twelve second teeth 64 are alternately arranged in the circumferential direction ZC.

The yoke holder 51 is made of resin. As illustrated in FIG. 2 and FIG. 3, the yoke holder 51 has a cylindrical shape. The yoke holder 51 is disposed so as to be coaxial with the column shaft 11. The yoke holder 51 holds the first magnetic yoke 60A and the second magnetic yoke 60B. Specifically, the yoke holder 51 is injection-molded by pouring the resin into dies in which the first magnetic yoke 60A and the second magnetic yoke 60B are placed. In this way, the yoke holder 51 is integrated with the first magnetic yoke 60A and the second magnetic yoke 60B.

As illustrated in FIG. 2 and FIG. 3, the magnetic flux collecting unit 70 has a cylindrical shape. The magnetic flux collecting unit 70 is secured to the inner peripheral face of a housing 18. The magnetic flux collecting unit 70 is disposed radially outward of the magnetic yoke unit 50 so as to be apart from the magnetic yoke unit 50 in the radial direction ZB and so as to be coaxial with the column shaft 11. The magnetic flux collecting unit 70 surrounds the magnetic yoke unit 50 in the radial direction ZB. The magnetic flux collecting unit 70 has a pair of magnetic flux collecting rings 71 and a magnetic flux collection holder 72 (refer to FIG. 3).

The magnetic flux collecting rings 71 are made of a soft magnetic metal material. The magnetic flux collecting rings 71 each have an annular shape (more specifically, a C-shape). The magnetic flux collecting rings 71 are disposed so as to be coaxial with the column shaft 11. The two magnetic flux collecting rings 71 are located outward of the first ring 61 of the first magnetic yoke 60A and the second ring 63 of the second magnetic yoke 60B in the radial direction ZB, respectively. The two magnetic flux collecting rings 71 are disposed so as to be apart from each other in the axial direction ZA. Each of the magnetic flux collecting rings 71 has two sensor opposing portions 71A. The sensor opposing portions 71A of each magnetic flux collecting ring 71 protrude toward the opposed magnetic flux collecting ring 71. The two sensor opposing portions 71A of one magnetic flux collecting ring 71 and the two sensor opposing portions 71A of the other magnetic flux collecting ring 71 are opposed to each other and apart from each other in the axial direction ZA.

The magnetic flux collection holder 72 is made of resin. The magnetic flux collection holder 72 has a cylindrical shape. The magnetic flux collection holder 72 is disposed so as to be coaxial with the column shaft 11. The magnetic flux collection holder 72 holds the two magnetic flux collecting rings 71. Specifically, the two magnetic flux collecting rings 71 are attached to the inner peripheral face of the magnetic flux collection holder 72.

The magnetic sensors 31 are Hall ICs in the present embodiment. Each of the two magnetic sensors 31 is disposed in a gap between the two sensor opposing portions 71A that are opposed to each other. Each of the magnetic sensors 31 transmits a signal corresponding to the density of magnetic flux flowing between the sensor opposing portions 71A that are opposed each other, to the controller 80 (refer to FIG. 1).

The operation of the torque detector 30 will be described with reference to FIG. 7A to FIG. 7C and FIG. 8. In a state illustrated in FIG. 7A, in which no torsion torque is applied between the input shaft 11A and the output shaft 11B, that is, in a state where the torsion bar 11C is not twisted, the center positions of the first and second teeth 62, 64 of the magnetic yokes 60 coincide with boundary positions between the north poles and the south poles of the permanent magnet 41. At this time, the number of magnetic lines of force entering the teeth 62, 64 of the magnetic yokes 60 from the north poles of the permanent magnet 41 is equal to the number of magnetic lines of force entering the teeth 62, 64 of the magnetic yokes 60 from the south poles of the permanent magnet 41, and thus the magnetic lines of force are closed in both the first magnetic yoke 60A and the second magnetic yoke 60B. Thus, no leakage of the magnetic flux occurs between the first magnetic yoke 60A and the second magnetic yoke 60B. As a result, the magnetic flux densities detected by the magnetic sensors 31 are zero (refer to FIG. 8).

Figure 7A:
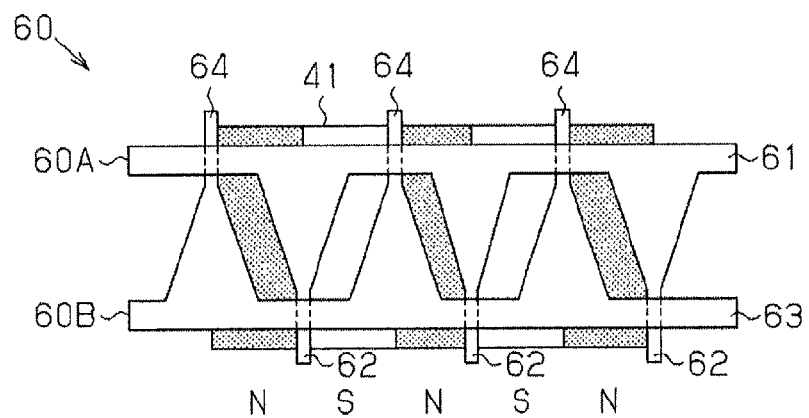
FIG. 7A, FIG. 7B and FIG. 7C are side views each illustrating the positional relationship between a pair of the magnetic yokes and the permanent magnet of the torque detector according to the embodiment.
Figure 7B:
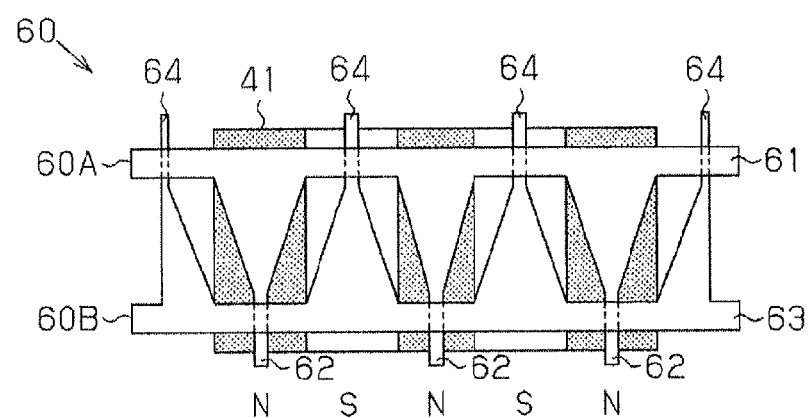
Figure 7C:
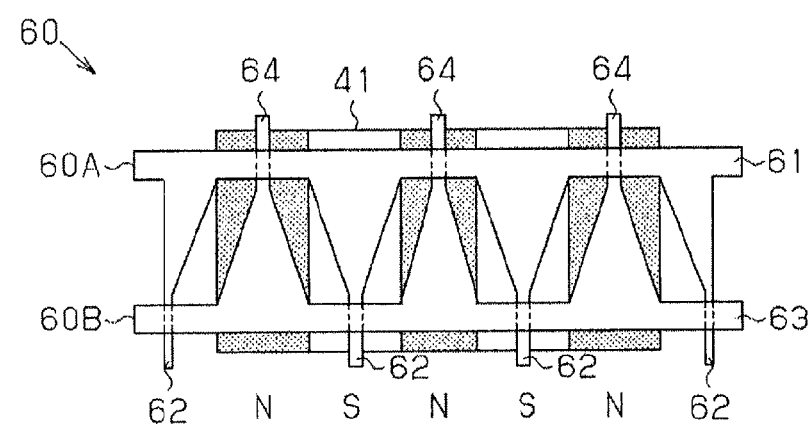
Figure 8:
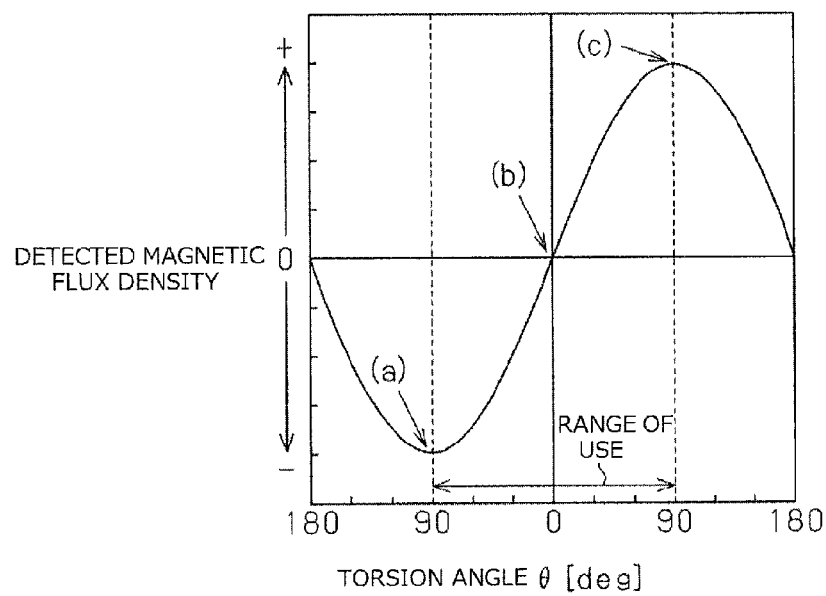
FIG. 8 is a graph illustrating the relationship between the torsion angle output from the torque detector, and the detected magnetic flux density.

On the other hand, in a state where torsional torque is applied between the input shaft 11A and the input shaft 11B, that is, in a state where the torsion bar 11C is twisted, as illustrated in FIG. 7B and FIG. 7C, the center positions of the first and the second teeth 62, 64 do not coincide with the boundary positions between the north poles and the south poles of the permanent magnet 41. Thus, in the first magnetic yoke 60A and the second magnetic yoke 60B, the magnetic lines of force from the north poles or the south poles are increased.

At this time, in the first magnetic yoke 60A and the second magnetic yoke 60B, the magnetic lines of force having polarities that are opposite to each other are increased. Thus, the magnetic flux density between the first magnetic yoke 60A and the second magnetic yoke 60B is changed. As indicated by a graph illustrated in FIG. 8, the magnetic flux density is substantially in proportion to a torsion amount (absolute value of a torsion angle θ), and the polarity is reversed depending upon the direction in which the torsion bar 11C is twisted. The magnetic flux density is detected by the magnetic sensors 31 and is then transmitted in the form of voltage signals from the magnetic sensors 31.

The configuration of the magnetic yokes 60, which is a main characterizing portion of the invention, will be described with reference to FIG. 4A and FIG. 4B, and FIG. 5A to FIG. 5C. As described above, the first magnetic yoke 60A has the first ring 61 and the twelve first teeth 62. The first ring 61 has an annular plate shape. The twelve first teeth 62 extend from the inner edge portion of the first ring 61 in the axial direction ZA. Each of the first teeth 62 has a first base portion 62A, a first distal portion 62B and a first joint portion 62C.

Figure 4B:
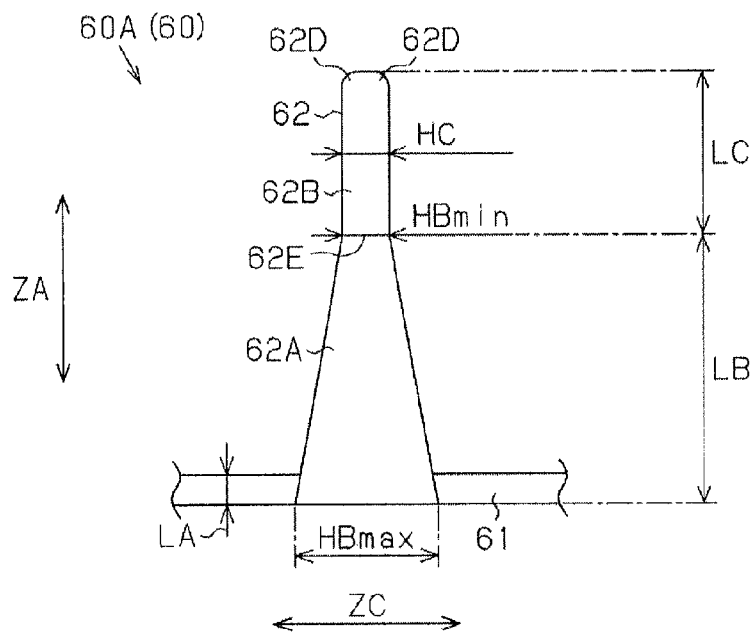

As illustrated in FIG. 4B, the first base portion 62A has a trapezoidal shape when viewed from the front in the radial direction ZB. The first base portion 62A extends in the axial direction ZA of the column shaft 11. The width of the first base portion 62A in the circumferential direction ZC is decreased in a direction away from the first ring 61.

The first distal portion 62B has the shape of a rectangle when viewed from the front in the radial direction ZB. The length of the rectangle in the axial direction ZA is larger than the length thereof in the circumferential direction ZC. The first distal portion 62B extends from the distal end of the first base portion 62A in the axial direction ZA. In the present embodiment, corner portions 62D, which are located at the distal end of the first distal portion 62B and which are respectively located on the opposite sides of the first distal portion 62B in the circumferential direction ZC, are chamfered into a rounded shape.

The first joint portion 62C extends inward in the radial direction ZB (toward the permanent magnet 41) from the inner edge portion of the first ring 61. The first joint portion 62C connects the first ring 61 and the first base portion 62A to each other. That is, the first base portion 62A and the first distal portion 62B are located inward of the first ring 61 in the radial direction ZB (the first base portion 62A and the first distal portion 62B are located closer to the permanent magnet 41 than the first ring 61). As illustrated in FIG. 5, the second magnetic yoke 60B has the same configuration as that of the first magnetic yoke 60A, and therefore detailed description on the second magnetic yoke 60B will be omitted.

Figure 5A:
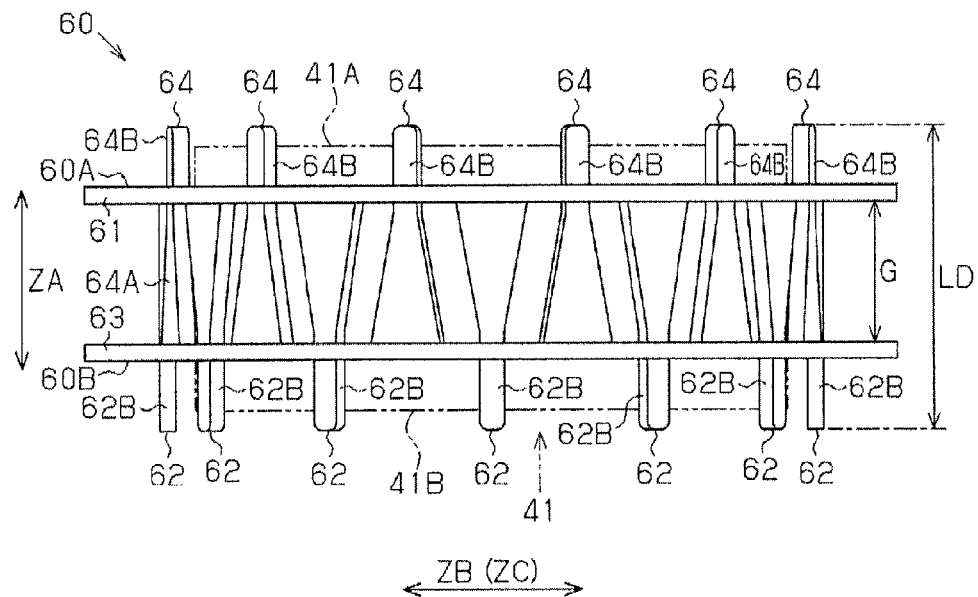

As illustrated in FIG. 5A, the first teeth 62 of the first magnetic yoke 60A extend in the axial direction ZA beyond the second ring 63 of the second magnetic yoke 60B. In the present embodiment, the first teeth 62 extend in the axial direction ZA, beyond one end portion of the permanent magnet 41. Similarly, the second teeth 64 of the second magnetic yoke 60B extend in the axial direction ZA beyond the first ring 61 of the first magnetic yoke 60A. In the present embodiment, the second teeth 64 extend in the axial direction ZA beyond the other end portion of the permanent magnet 41.

Figure 5B:
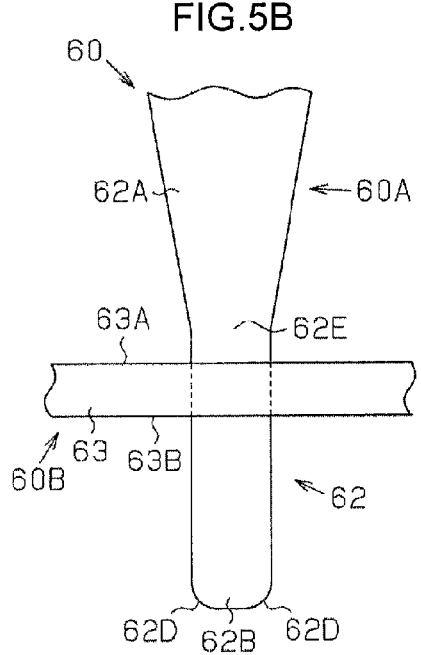
Figure 5C:
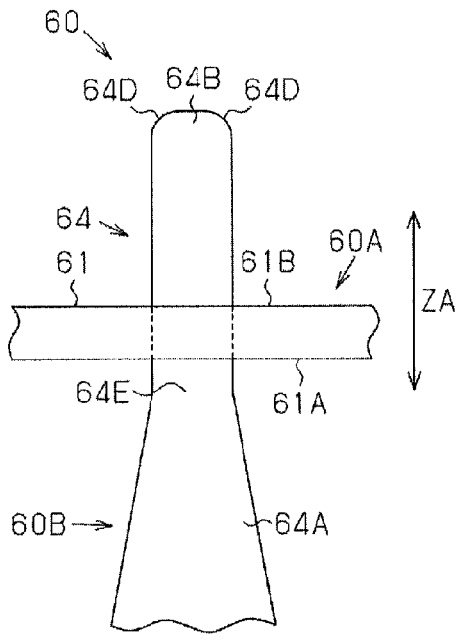

As illustrated in FIG. 5B, the position of a boundary 62E between the first base portion 62A and the first distal portion 62B of each first tooth 62 in the axial direction ZA is located closer to the first ring 61 than a first end face 63A of the second ring 63 in the axial direction ZA (refer to FIG. 5A). The boundary 62E is located near the first end face 63A of the second ring 63. Similarly, as illustrated in FIG. 5C, the position of a boundary 64E between the second base portion 64A and the second distal portion 64B of each second tooth 64 in the axial direction ZA is located closer to the second ring 63 than a first end face 61A of the first ring 61 in the axial direction ZA (refer to FIG. 5A). The width of each of the boundaries 62E, 64E is equal to a width HBmin, which is the minimum width of each of the base portions 62A, 64A.

The dimensions of the permanent magnet 41 and the magnetic yokes 60 in the present embodiment are indicated in Table 1.

TABLE 1

| | |
|---|---|
| Length of permanent magnet 41 in axial direction ZA | 12.0 mm |
| Outer diameter of permanent magnet 41 | 30.0 mm |
| Outer diameter RA of rings 61, 63 | 40.0 mm |
| Length LA of rings 61, 63 in axial direction ZA | 1.0 mm |
| Maximum width HBmax of base portions 62A, 64A | 3.6 mm |
| Minimum width HBmin of base portions 62A, 64A | 1.1 mm |
| Length LB of base portions 62A, 64A in axial direction ZA | 7.0 mm |
| Width HC of distal portions 62B, 64B | 1.1 mm |
| Length LC of distal portions 62B, 64B in axial direction ZA | 4.0 mm |
| Length G of space between first ring 61 and second ring 63 | 7.0 mm |
| Distance LD between distal end face of first tooth 62 and distal end face of second tooth 64 | 13.0 mm |

Figure 6A:
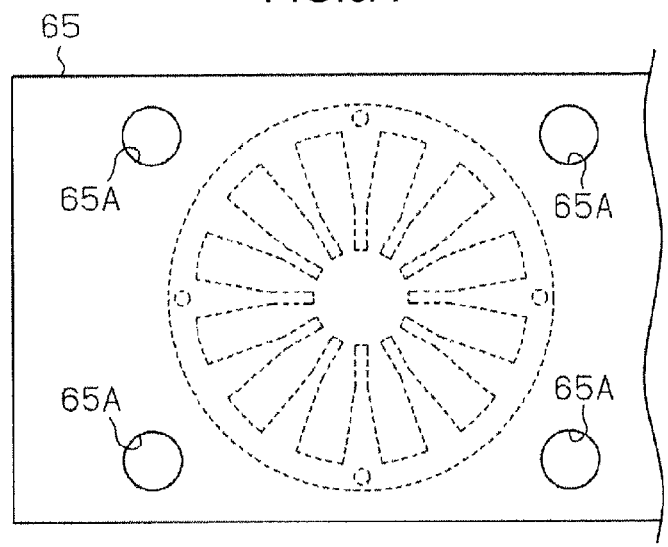
Figure 6B:
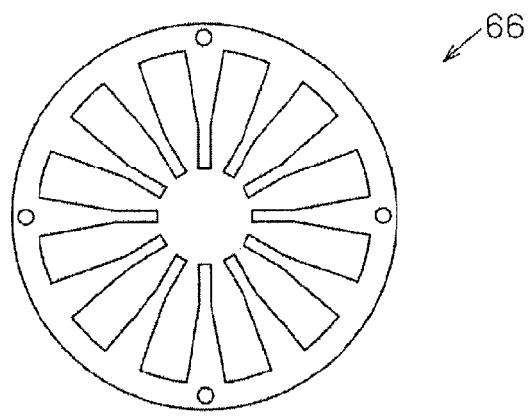
Figure 6C:
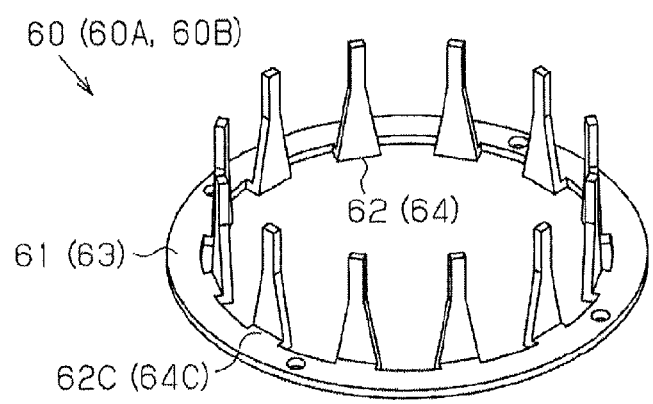

With reference to FIG. 6A to FIG. 6C, a method of manufacturing the magnetic yokes 60 will be described. At first, a soft magnetic steel sheet 65 (illustrated in FIG. 6A) is positioned by inserting pins (not illustrated) in positioning holes 65A that are formed in the soft magnetic steel sheet 65, at positions outside a portion to be processed (magnetic yoke workpiece 66 indicated by the broken line in FIG. 6A) (first step).

Then, the soft magnetic steel sheet 65 (illustrated in FIG. 6A) is punched to obtain the magnetic yoke workpiece 66 (illustrated in FIG. 6B) by press working (second step). Prescribed parts of the magnetic yoke workpiece 66 obtained by press working in the second step and illustrated in FIG. 6B are bent so as to form the first teeth 62 (second teeth 64) illustrated in FIG. 6C. In this way, the magnetic yokes 60 are obtained (third step).

The relationship between the detected magnetic flux density and the axial length of each of the first teeth 62 and the second teeth 64 will be described with reference to FIG. 9, FIG. 10A, FIG. 10B, FIG. 11A and FIG. 11B. The graph G1 in FIG. 9 exhibits the relationship between the axial length of each of the first teeth 62 and the second teeth 64 and the detected magnetic density, which is a result obtained by simulation. In this simulation, the length of each of the first teeth 62 and the second teeth 64 was changed by changing the axial length of each of the first distal portions 62B and the second distal portions 64B without changing the size and the shape of each of the first base portions 62A and the second base portions 64A. Further, in this simulation, the axial length of the permanent magnet 41 was set sufficiently larger than the axial length of each of the first teeth 62 and the second teeth 64.

With reference to FIG. 10A, FIG. 10B, FIG. 11A and FIG. 11B, torque detectors in comparative examples will be hereinafter described. In the following description, for the sake of convenience, the same configurations as those in the present embodiment will be denoted by the same reference symbols as those in the present embodiment, and description thereof will be omitted.

Figure 10A:
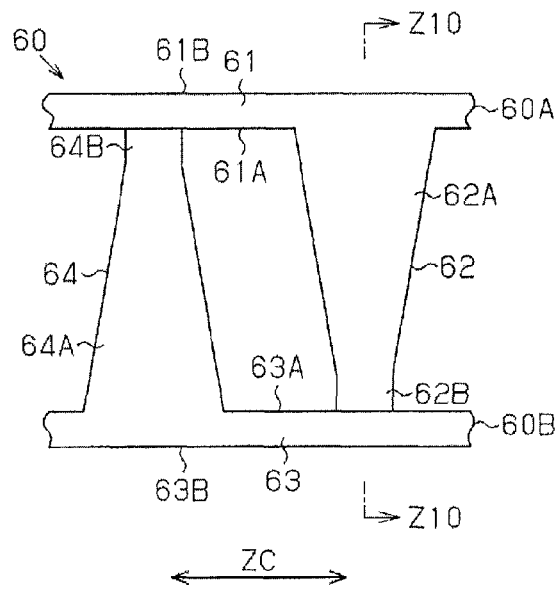
Figure 10B:
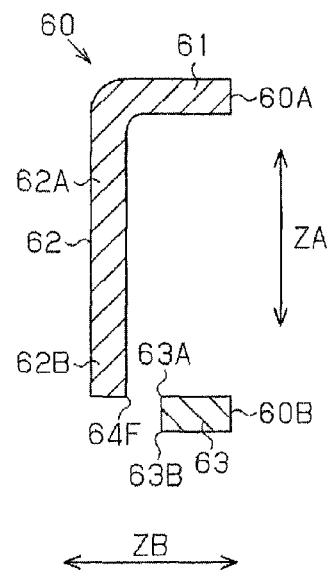

When a length LX of each of the first teeth 62 and the second teeth 64 in the axial direction ZA is set to LX1, as illustrated in FIG. 10B, the position of the distal end portion of the first distal portion 62B in the axial direction ZA coincides with the position of the first end face 63A of the second ring 63 in the axial direction ZA. Similarly, although not illustrated in FIG. 10B, the position of the distal end portion of the second distal portion 64B in the axial direction ZA coincides with the position of the first end face 61A of the first ring 61 in the axial direction ZA.

Figure 11A:
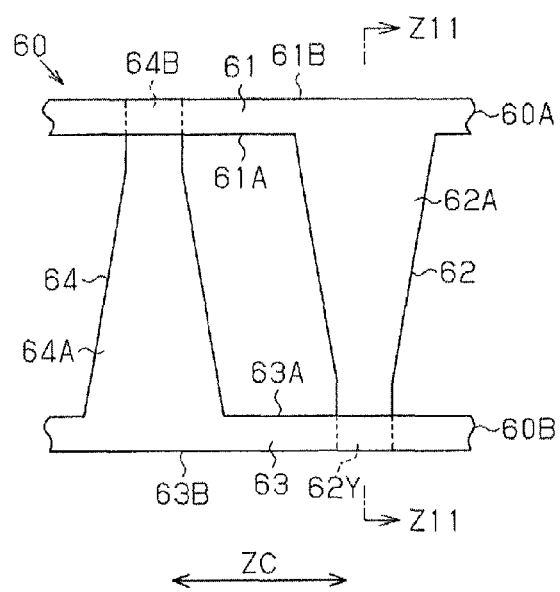
Figure 11B:
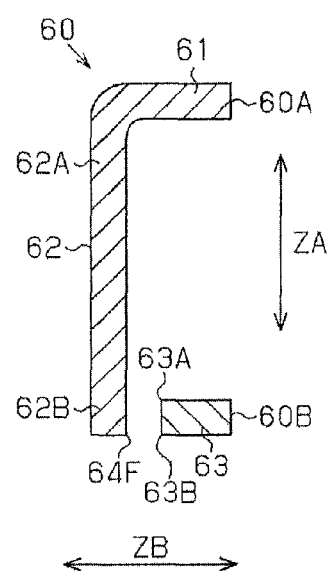

When a length LX of each of the first teeth 62 and the second teeth 64 in the axial direction ZA is set to LX2 (LX2>LX1), as illustrated in FIG. 11B, the position of the distal end portion of the first distal portion 62B in the axial direction ZA coincides with the position of a second end face 63B of the second ring 63 in the axial direction ZA. Similarly, although not illustrated in FIG. 11B, the position of the distal end portion of the second distal portion 64B in the axial direction ZA coincides with the second end face 61B of the first ring 61 in the axial direction ZA.

As a whole, as the length of each of the first distal portion 62B and the second distal portion 64B in the axial direction ZA is increased, the detected magnetic flux density becomes larger. This is because as the length of each of the first distal portion 62B and the second distal portion 64B in the axial direction ZA is increased, the area of each of the first teeth 62 and the second teeth 64, which are opposed to the permanent magnet 41, becomes larger, and thus, the amount of magnetic flux that is transferred between the permanent magnet 41 and the magnetic yokes 60 is increased.

Figure 9:
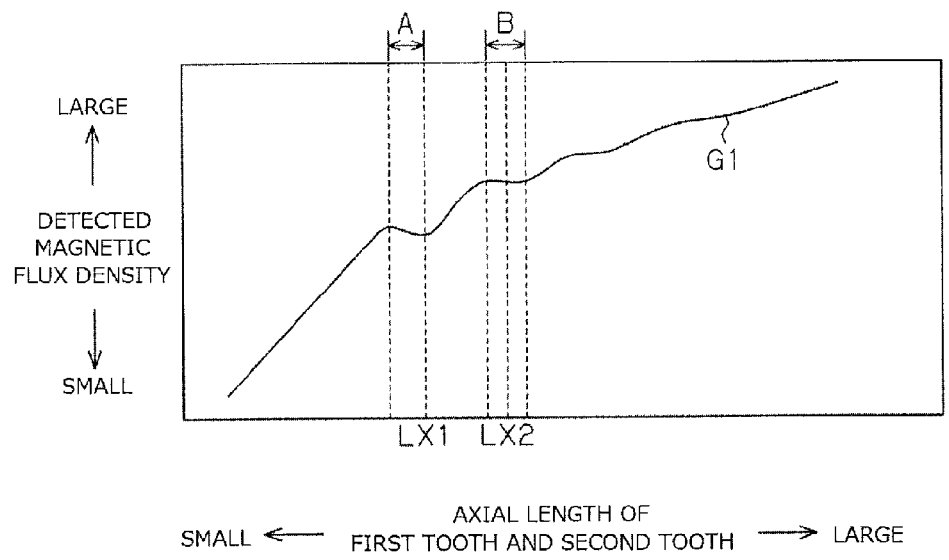
FIG. 9 is a graph for describing the operation and effect of the torque detector according to the embodiment, and illustrating the relationship between the length of each of the first teeth and the second teeth in the axial direction, and the detected magnetic flux density.

However, in each of a range A and a range B illustrated in FIG. 9, as the length of each of the first distal portion 62B and the second distal portion 64B is increased, the detected magnetic flux density is decreased. The reason why this is caused will be described below. In the range A, the distal end portion of the first distal portion 62B approaches the first end face 63A of the second ring 63 as the length of the first distal portion 62B is increased. In this case, the magnetic flux is likely to be concentrated on a corner portion formed at the distal end portion of the first distal portion 62B (an apex and sides of the distal end portion of the first distal portion 62B) and a corner portion of the second ring 63 (the boundary between an outer peripheral face and the first end face 63A of the second ring 63). Thus, as the distal end portion of the first distal portion 62B approaches the first end face 63A of the second ring 63, magnetic leakage is likely to occur between the first magnetic yoke 60A and the second magnetic yoke 60B. Similarly, as the distal end portion of the second distal portion 64B approaches the first end face 61A of the first ring 61, magnetic leakage is likely to occur between the first magnetic yoke 60A and the second magnetic yoke 60B. Therefore, it is estimated that, in the range A, the detected magnetic flux density is decreased as the length of each of the first distal portion 62B and the second distal portion 64B is increased. When the length of each of the first distal portion 62B and the second distal portion 64B is increased beyond the range A, the area of each of the teeth 62, 64, which are opposed to the permanent magnet 41, is increased, and the influence of the magnetic leakage described above is decreased. Thus, the detected magnetic flux density is again increased.

In the range B, as the length of the first distal portion 62B is increased, the distal end portion of the first distal portion 62B approaches the second end face 63B of the second ring 63. Thus, the corner portion formed at the distal end portion of the first distal portion 62B and the corner portion of the second ring 63, on which the magnetic flux is likely to be concentrated, approach each other, and thus magnetic leakage is likely to occur between the first magnetic yoke 60A and the second magnetic yoke 60B. Thus, it is estimated that, in the range B, the detected magnetic flux density becomes smaller as the length of each of the first distal portion 62B and the second distal portion 64B is increased. When the length of each of the first distal portion 62B and the second distal portion 64B is increased beyond the range B, the area of each of the teeth 62, 64, which are opposed to the permanent magnet 41, is increased, and the influence of the magnetic leakage described above is decreased. Thus, the detected magnetic flux density is again increased.

As described above, according to the invention, the length LX of each of the teeth 62, 64 of the magnetic yokes 60 in the axial direction ZA is set larger than LX2. That is, the first teeth 62 of the first magnetic yoke 60A extend in the axial direction ZA beyond the second ring 63 of the second magnetic yoke 60B, and the second teeth 64 of the second magnetic yoke 60B extend in axial direction ZA beyond the first ring 61 of the first magnetic yoke 60A.

Figure 15:
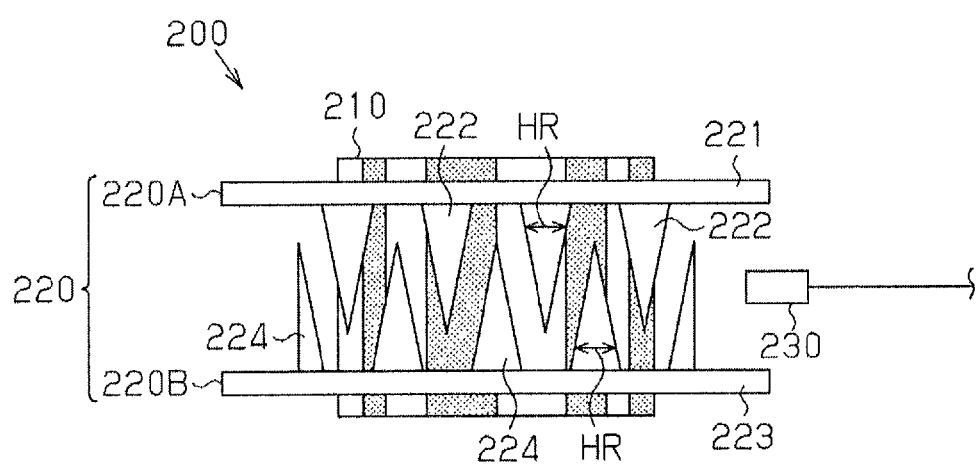
FIG. 15 is a view schematically illustrating the configuration of a conventional torque detector.

The advantageous effects produced by the torque detector 30 in the present embodiment will be described below. As the opposing area between the permanent magnet 41 and the magnetic yokes 60 becomes larger, the amount of magnetic flux transferred between the permanent magnet 41 and the magnetic yokes 60 is increased, and thus the accuracy of detection by the torque detector 30 is enhanced. In the conventional torque detector 200 illustrated in FIG. 15, in order to increase the opposing area between the permanent magnet 210 and the magnetic yokes 220, the width HR of each of the first and second teeth 222, 224 may be increased.

However, if the width HR of each of the teeth 222, 224 is increased, the gaps between the first teeth 222 and the second teeth 224 that are adjacent to each other in the circumferential direction ZC become smaller. Thus, the amount of magnetic flux leakage between the first teeth 222 and the second teeth 224 that are adjacent to each other in the circumferential direction ZC is increased. Thus, even though the opposing area between the permanent magnet 201 and the teeth 222, 224 is increased, the detected magnetic flux density is less likely to be increased.

In the present embodiment, each first tooth 62 and each second tooth 64 of the magnetic yokes 60 respectively have the first distal portion 62B and the second distal portion 64B. Thus, the opposing area between the teeth 62, 64 and the permanent magnet 41 is increased while the sufficiently large gaps between the teeth 62 and the teeth 64, which are adjacent to each other in the circumferential direction ZC, are ensured. In other words, with the formation of the first distal portions 62B and the second distal portions 64B, the opposing area between the permanent magnet 41 and the magnetic yokes 60 can be increased without increasing the width of each of the first teeth 62 and the second teeth 64. Thus, the magnetic leakage caused between the teeth 62 and the teeth 64 that are adjacent to each other in the circumferential direction ZC is suppressed, and thus the amount of the magnetic flux transferred between the permanent magnet 41 and the magnetic yokes 60 is increased. Consequently, it is possible to increase the detected magnetic flux density. As a result, a gain with which signals from the magnetic sensors 31 are amplified can be set to a smaller value, and thus a signal-noise (SN) ratio of the signals from the magnetic sensors 31 can be suppressed. As a result, it is possible to enhance the accuracy of detection by the torque detector 30.

The first teeth 62 of the first magnetic yoke 60A extend in the axial direction ZA beyond the second ring 63 of the second magnetic yoke 60B, and the second teeth 64 of the second magnetic yoke 60B extend in the axial direction ZA beyond the first ring 61 of the first magnetic yoke 60A. That is, the corner portions 62F, 64F of the distal portions 62B, 64B are not opposed in the radial direction ZB to the end faces 61A, 61B, 63A, 63B of the rings 61, 63. Thus, the magnetic leakage between the distal portions 62B, 64B and the rings 61, 63 is suppressed. As a result, the detected magnetic flux density is increased. As a result, it is possible to enhance the accuracy of detection by the torque detector 30.

In the present embodiment, as described above, the magnetic yoke workpiece 66 is obtained by punching the soft magnetic steel sheet 65 (refer to FIG. 6) through press working. Thus, the material cost of the magnetic yoke 60 in the present embodiment is not higher than that of the conventional magnetic yoke 220 having no distal portions. Further, the magnetic yoke 60 in the present embodiment is obtained with less waste material and less environmental load.

The first teeth 62 and the second teeth 64 extend in the axial direction ZA beyond the end portions of the permanent magnet 41. With this configuration, even if the relative positions between the permanent magnet 41 and the magnetic yokes 60 in the axial direction ZA vary due to dimensional variations and assembly errors, the opposing area between the first teeth 62 and the permanent magnet 41 and the opposing area between the second teeth 64 and the permanent magnet 41 are restrained from being different from each other. In addition, the teeth 62, 64 can efficiently receive the magnetic flux from corner portions 41A, 41B (refer to FIG. 3) at the opposite end portions of the permanent magnet 41, on which the magnetic flux is concentrated. Thus, the detected magnetic density is increased.

The distal portions 62B, 64B are each formed in a rectangular shape in a planar view. With this configuration, the opposing area between the teeth 62, 64 and the permanent magnet 41 is larger than that in the configuration in which the distal portions 62B, 64B are tapered in the axial direction ZA. Thus, the detected magnetic flux density is increased. If the width HC of each of the distal portions 62B, 64B is set excessively large in order to increase the opposing area between the teeth 62, 64 and the permanent magnet 41, the magnetic yoke workpiece 66 cannot be obtained by punching a single soft magnetic steel sheet 65.

The corner portions 62D, 64D of the distal end portions of the distal portions 62B, 64B are chamfered into a rounded shape. With this configuration, magnetic leakage from the corner portions 62D, 64D to the teeth 62, 64 adjacent to the corner portions 62D, 64D is suppressed.

The electric power steering system and the torque detector according to the invention are not limited to those in the embodiment described above. Modified examples of the embodiment described above will be described below as other embodiments. Note that the following modified examples may be combined with each other within a technically-feasible scope.

Figure 12:
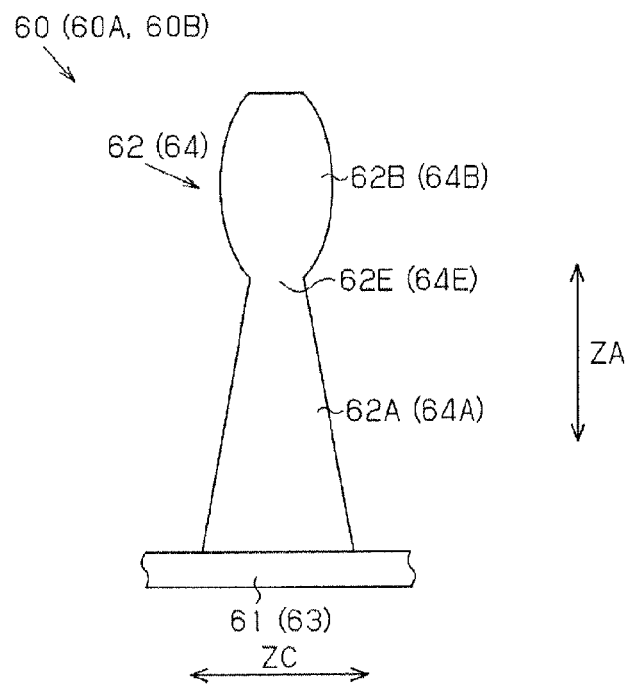
FIG. 12 is a front view illustrating part of a magnetic yoke of a torque detector according to another embodiment of the invention.

Although the distal portions 62B, 64B are rectangular when viewed from the front in the radial direction ZB in the embodiment described above, the distal portions 62B, 64B may be elliptical when viewed from the front in the radial direction ZB, as illustrated in FIG. 12. Alternatively, the distal portions 62B, 64B may be tapered in the axial direction ZA such that the width thereof is decreased in a direction away from the rings 61, 63, when viewed from the front in the radial direction ZB.

Figure 14:
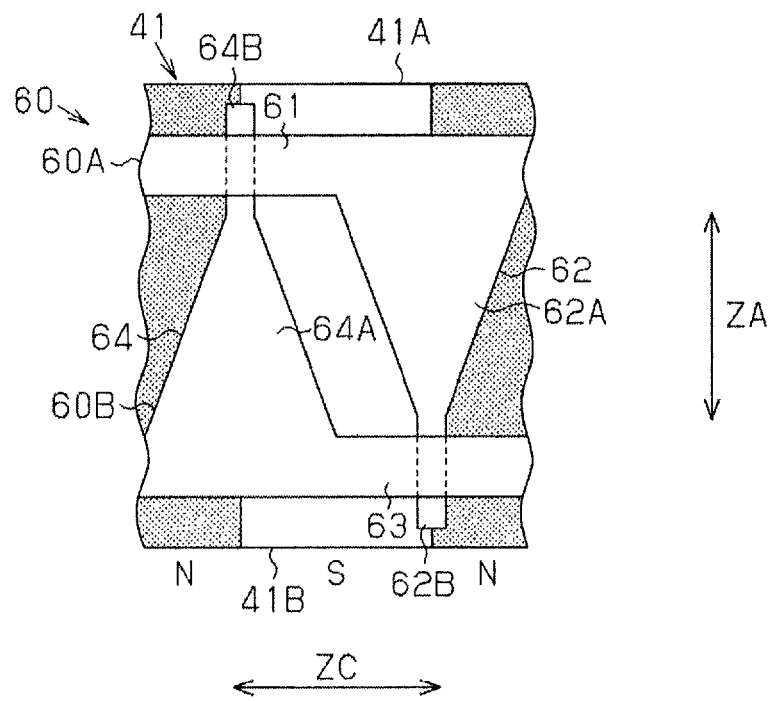
FIG. 14 is a side view illustrating the positional relationship between magnetic yokes and a permanent magnet of a torque detector according to another embodiment of the invention.

In the embodiment described above, the first teeth 62 and the second teeth 64 extend in the axial direction ZA beyond the end portions of the permanent magnet 41. However, the first teeth 62 and the second teeth 64 need not extend beyond the end portions of the permanent magnet 41 in the axial direction ZA, as illustrated in FIG. 14.

Figure 13:
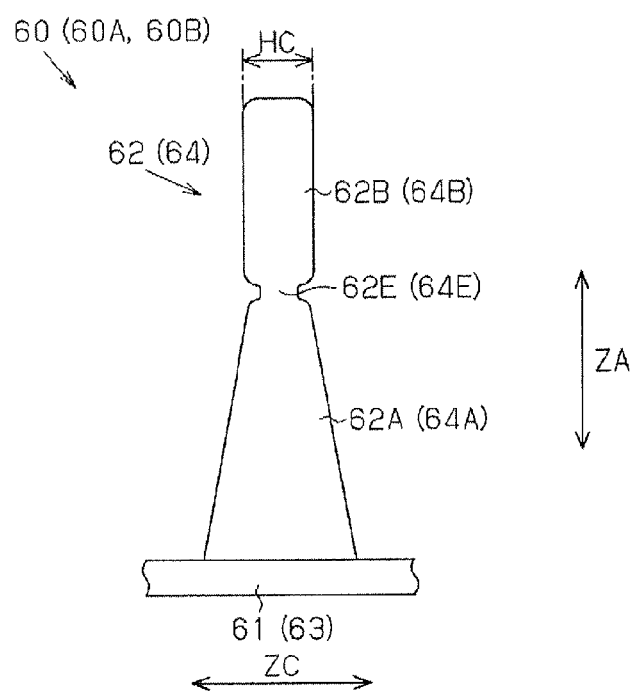
FIG. 13 is a front view illustrating part of a magnetic yoke of a torque detector according to another embodiment of the invention.

In the embodiment described above, the width of each of the boundaries 62E, 64E is set equal to the width HC of each of the distal portions 62B, 64B. However, the width of each of the boundaries 62E, 64E may be set smaller than the width HC of each of the distal portions 62B, 64B, as illustrated in FIG. 13. In the embodiment described above, the boundaries 62E, 64E are offset from the rings 61, 63 in the radial direction RB. However, the boundaries 62Em 64E may be opposed respectively to the rings 61, 63 in the radial direction RB.

In the embodiment described above, the rings 61, 63 have an annular shape. However, the rings 61, 63 may have a circular arc-shape, a polygonal shape, or the like. In the embodiment described above, the magnetic yoke 60 is a single-piece member having the ring 61 (63) and the multiple teeth 62 (64). However, the magnetic yoke 60 may be formed by joining the multiple teeth 62 (64) to the ring 61 (63).

The magnetic flux collecting unit 70 may be omitted from the torque detector 30 in the embodiment described above. In this case, the magnetic sensors 31 are arranged between the first ring 61 and the second ring 63. In the embodiment described above, the torque detector 30 is applied to the column assist-type electric power steering system 1. Alternatively, the torque detector 30 may be applied to a rack assist-type electric power steering system or a pinion assist-type electric power steering. The position at which the torque detector 30 is mounted is not limited to the position described in the above embodiment.

What is claimed is:

1. A torque detector comprising:
a permanent magnet attached to one of an input shaft and an output shaft that are connected to each other by a torsion bar so as to be rotated relative to each other in response to torsion of the torsion bar, and magnetized in a circumferential direction of the torque detector;
magnetic yokes including a first magnetic yoke having a first ring disposed around an outer periphery of the permanent magnet and a plurality of first teeth extending from the first ring in an axial direction of the torque detector, and a second magnetic yoke having a second ring disposed around the outer periphery of the permanent magnet so as to be opposed to and apart from the first ring in the axial direction and a plurality of second teeth extending from the second ring toward the first ring in the axial direction, the first teeth and the second teeth being alternately arranged in the circumferential direction, and the magnetic yokes being attached to the other one of the input shaft and the output shaft so as to be located in a magnetic field created by the permanent magnet; and
a magnetic sensor that detects a magnetic flux density of a magnetic circuit formed of the permanent magnet, the first magnetic yoke and the second magnetic yoke, wherein
the first teeth extend in the axial direction beyond the second ring, and the second teeth extend in the axial direction beyond the first ring.

2. The torque detector according to claim 1, wherein:
each of the first teeth has a first joint portion that is located closer to the permanent magnet than the first ring is in a radial direction of the torque detector, and that connects the first ring and the first tooth to each other in the radial direction; and
each of the second teeth has a second joint portion that is located closer to the permanent magnet than the second ring is in the radial direction, and that connects the second ring and the second tooth to each other in the radial direction.

3. The torque detector according to claim 1, wherein:
a width of a portion of each of the first teeth, the portion being opposed to the second ring in a radial direction of the torque detector, is equal to or smaller than a width of a portion of each of the first teeth, the portion being located closer to the first ring than the second ring is; and a width of a portion of each of the second teeth, the portion being opposed to the first ring in the radial direction, is equal to or smaller than a width of a portion of each of the second teeth, the portion being located closer to the second ring than the first ring is.

4. The torque detector according to claim 2, wherein:
a width of a portion of each of the first teeth, the portion being opposed to the second ring in the radial direction, is equal to or smaller than a width of a portion of each of the first teeth, the portion being located closer to the first ring than the second ring is; and a width of a portion of each of the second teeth, the portion being opposed to the first ring in the radial direction, is equal to or smaller than a width of a portion of each of the second teeth, the portion being located closer to the second ring than the first ring is.

5. The torque detector according to claim 1, wherein:
the first teeth extend in the axial direction beyond one end portion of the permanent magnet; and
the second teeth extend in the axial direction beyond the other end portion of the permanent magnet.

6. The torque detector according to claim 1, wherein:
each of the first teeth has a first base portion formed in a trapezoidal shape and extending from the first ring, and a first distal portion formed in a rectangular shape and extending from a distal end of the first base portion; and
each of the second teeth has a second base portion formed in a trapezoidal shape and extending from the second ring, and a second distal portion formed in a rectangular shape and extending from a distal end of the second base portion.

7. An electric power steering system comprising the torque detector according to claim 1.

8. An electric power steering system comprising the torque detector according to claim 2.

9. An electric power steering system comprising the torque detector according to claim 3.

10. An electric power steering system comprising the torque detector according to claim 4.

11. An electric power steering system comprising the torque detector according to claim 5.

12. An electric power steering system comprising the torque detector according to claim 6.

* * * * *